United States Patent [19]

Dola

[11] Patent Number: 4,500,158
[45] Date of Patent: Feb. 19, 1985

[54] NETWORK INTERFACE DEVICE

[75] Inventor: Frank P. Dola, Port Richey, Fla.

[73] Assignee: AMP Incorporated, Harrisburg, Pa.

[21] Appl. No.: 499,659

[22] Filed: May 31, 1983

[51] Int. Cl.³ .......................................... H01R 13/514
[52] U.S. Cl. ............................. 339/122 R; 339/176 M
[58] Field of Search ................... 339/122 R, 123, 125, 339/126, 17 L, 17 LC, 91 R, 176 M, 176 MP, 191 R; 179/91 R, 98

[56] References Cited

U.S. PATENT DOCUMENTS

| | | | |
|---|---|---|---|
| 2,524,250 | 10/1950 | Bierce | 339/123 |
| 4,146,292 | 3/1979 | Garrett | 339/125 R |
| 4,220,391 | 9/1980 | Krolak et al. | 339/126 R |
| 4,237,342 | 12/1980 | Eller et al. | 179/91 R |
| 4,269,463 | 5/1981 | Beatenbough | 339/91 R |
| 4,273,957 | 6/1981 | Kolling, Jr. | 179/98 |
| 4,290,664 | 9/1981 | Davis et al. | 339/125 R |
| 4,303,296 | 12/1981 | Spaulding | 339/126 R |
| 4,343,527 | 8/1982 | Harrington et al. | 339/125 R |
| 4,382,649 | 5/1983 | Meyer | 339/122 R |
| 4,407,559 | 10/1983 | Meyer | 339/126 R |

OTHER PUBLICATIONS

Western Electric Technical Digest, No. 63, Jul. 1981, "Surface Mounted Connecting Block", by W. A. Dix, p. 15.

Primary Examiner—Gil Weidenfeld
Assistant Examiner—Thomas M. Kline
Attorney, Agent, or Firm—F. Bruce Faller; Russell J. Egan

[57] ABSTRACT

Electrical connector for telephone wiring interface comprises dielectric base having four stamped and formed first terminals thereon which receive screws for terminating wires and have upright first mating members aligned with apertures in a dielectric cover latched to base. Each first terminal is formed with a stanchion normal to the base and a spring contact which are received in a dielectric jack mounted to the base to provide testing by inserting a plug inserted through an aperture in the cover. A plug member has four stamped and formed second terminals fixed thereon which receive screws for terminating wires and upright second mating members arranged to mate with first mating members in apertures. Plug member has a leg flanking each second mating member, the legs being profiled to fit closely in apertures to align respective mating members for mating, which retains plug member against cover. Base and cover accommodate lightning arrestor and circuitry as desired.

6 Claims, 7 Drawing Figures

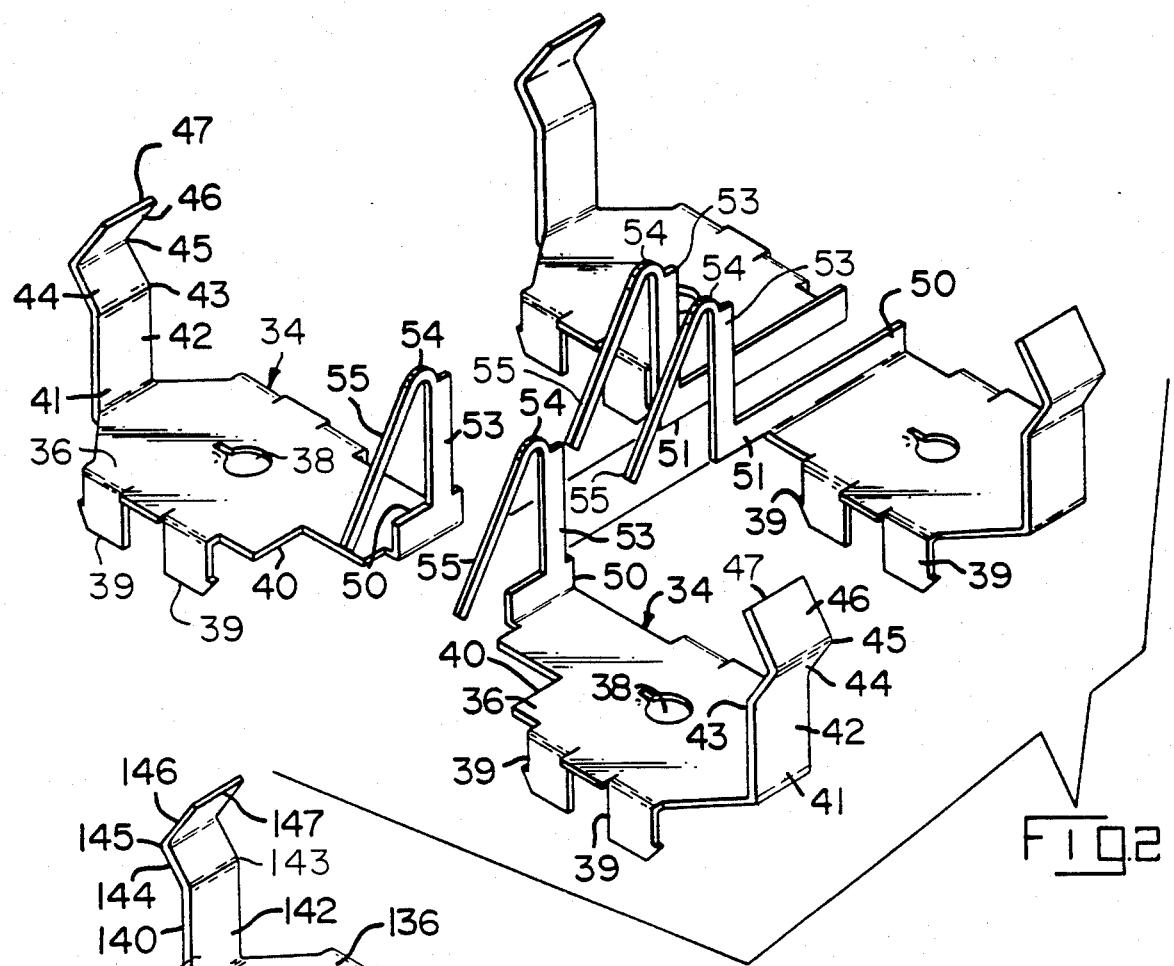
Fig.2
Fig.3
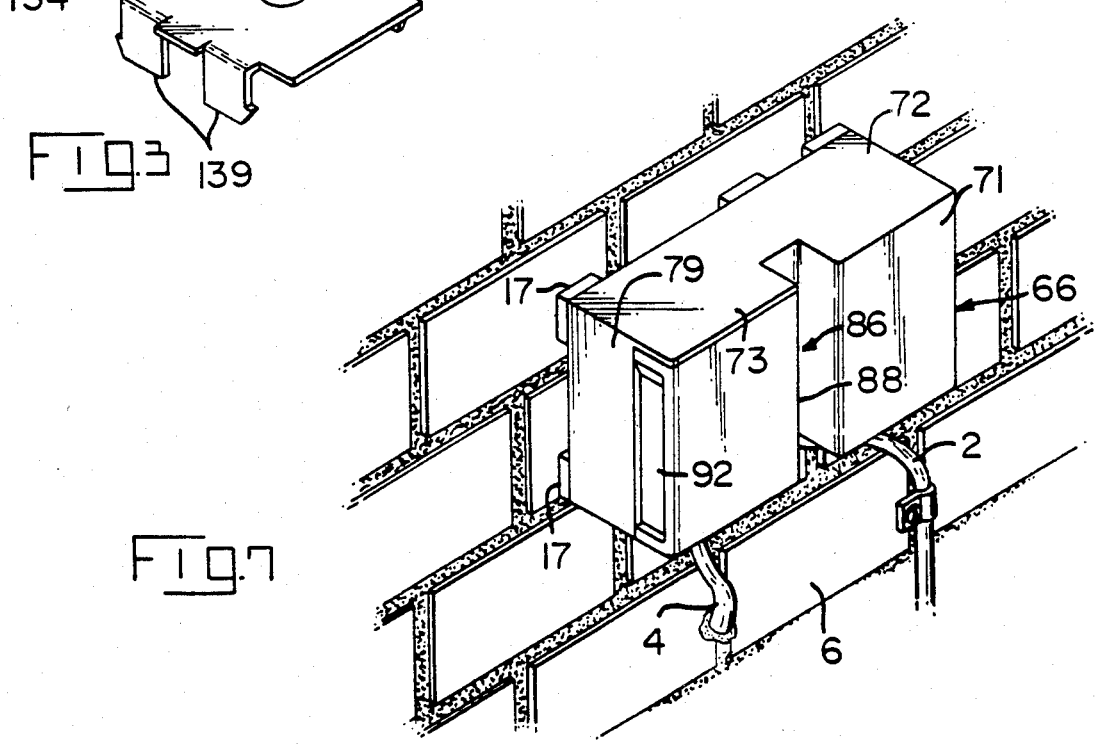
Fig.7

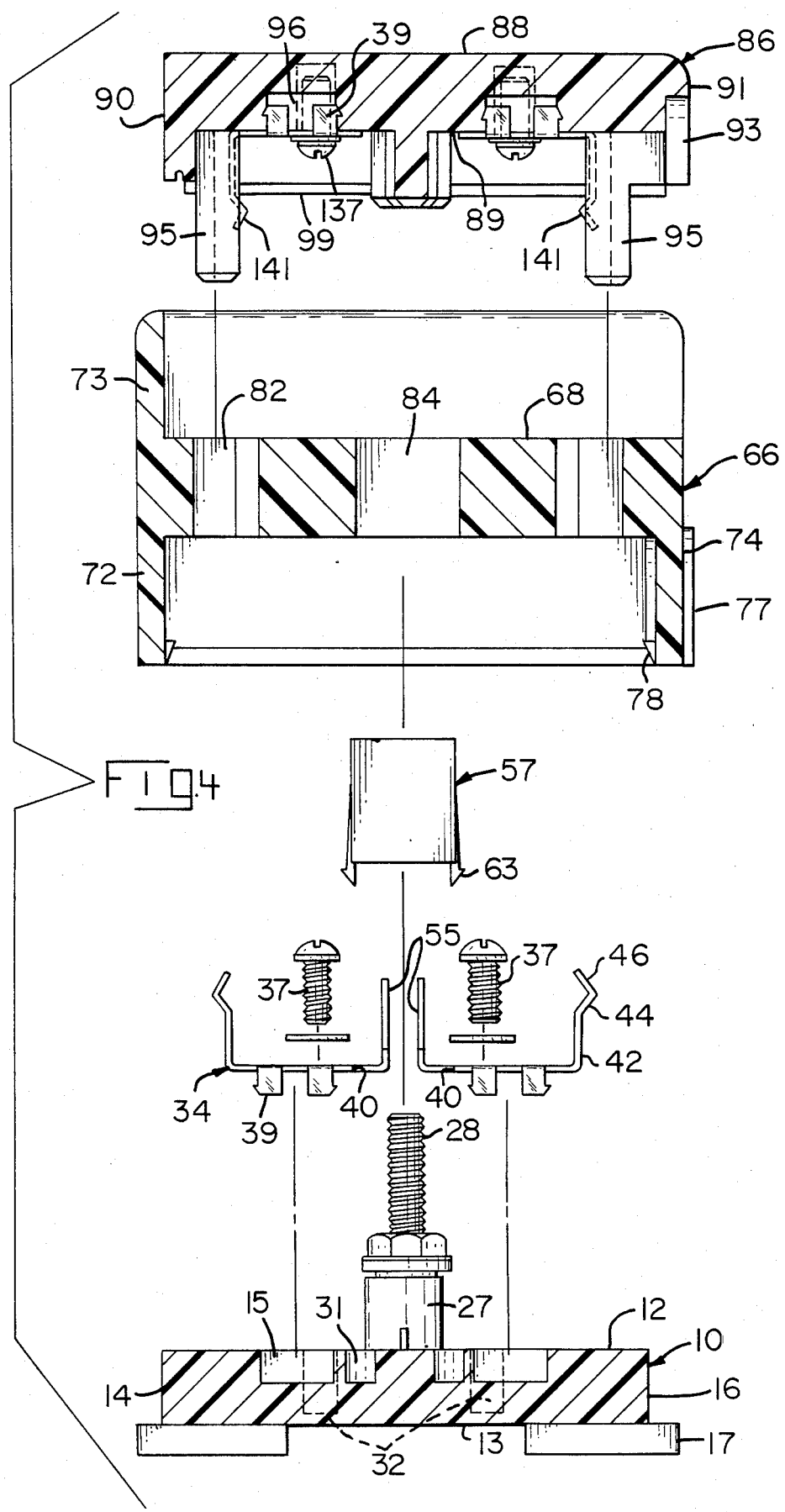

NETWORK INTERFACE DEVICE

FIELD OF THE INVENTION

The present invention relates to a releasable connector for connecting two groups of wires, particularly telephone wires.

BACKGROUND OF THE INVENTION

Recent deregulation of the telephone companies requires that all premises wiring be customer owned and that the serving telephone company provide a network interface device separating the company's wiring from the customer's wiring. The Electronic Industries Association recommends that a device be provided for connecting single-line service, and that two-line service should be provided at the network interface as two single-line services. The device should be foolproof and is intended to provide a means for isolating troubles between terminal equipment, premises wiring, and public network facilities. The device should provide a standard RJ11 jack for testing purposes, and should be weatherproof for outside mounting.

SUMMARY OF THE INVENTION

The network interface device of the present invention meets the design criteria by providing stamped and formed terminals having wire termination means, mating means for another terminal, and a spring contact for a phone jack formed integrally with each terminal. Four such terminals mounted to a base are arranged to mate with four similar terminals sans spring contacts on a plug member; the spring contacts are contained in a jack so that a customer may remove the plug member and use the jack to determine whether a malfunction is the responsibility of the phone company or himself. A cover fixed to the base has apertures for mating terminals and access to the test jack which is not readily removed, thus precluding the customer from tampering with phone company terminations or components therein. The assembly is protected from weather by channels between the plug member and cover which break surface tension of water, obviating the need for a conventional discrete seal. Phone company wires enter the cover through a grommet in the bottom sidewall thereof while premises wires enter the plug member through a grommet in the bottom sidewall thereof.

BRIEF DESCRIPTION OF THE DRAWINGS

FIG. 2 is a perspective of the first terminals.
FIG. 3 is a perspective of a second terminal.
FIG. 4 is an exploded end section of the device.
FIG. 7 is a perspective of the assembled device mounted to a wall.

DETAILED DESCRIPTION OF THE PREFERRED EMBODIMENT

Figure 1:
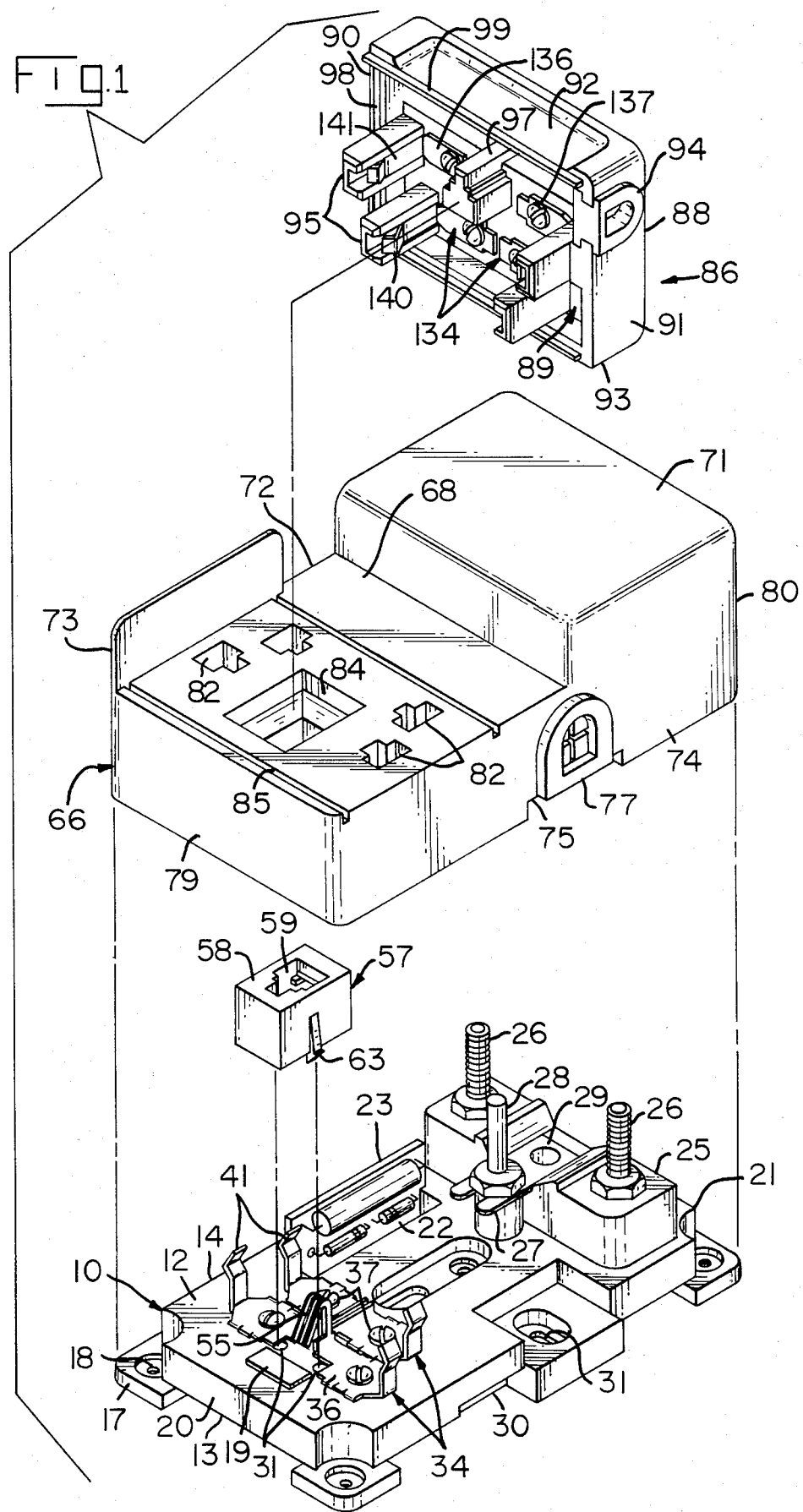
FIG. 1 is an exploded perspective of the device.

FIG. 1 is an exploded perspective of the network interface device showing the base 10, cover 66, and plug member 86 with other components assembled thereto. The base 10 is of molded plastic and comprises a first surface 12, an opposed second surface 13, top and bottom sides 14, 16 respectively, and left and right ends 20, 21 respectively. Legs 17 at the corners and other points of base 10 have holes 18 which permit mounting to a flat vertical surface such as a wall 6 (FIG. 7) with the bottom surface 13 of base 10 spaced from the wall. Legs 17 intermediate ends 20, 21, together with legs 17 at right end 21, permit mounting to pre-existing holes for a conventional square wall box. The top surface has a lightning arrestor 25 mounted therein with terminal posts 26 therein which are ultimately wired in series with incoming lines subject to lightning strike; a large enough power surge causes short circuiting through contact 29 to post 28, which is grounded. A circuit board 23 is ultimately wired to first terminals 34 but, like the lightning arrestor 25, is not essential to the present invention. First terminals 40 are fixed to top surface 12 and have screws 37 through intermediate portions 36 for terminating incoming phone company wires. Each first terminal 34 has a first mating member 41 and a spring contact 55; the four spring contacts 55 are received in a jack 57 having latch legs 63 which are received in holes 31 in base 10 and latched on ledges 40 of first terminals 34. The jack is mounted against intermediate portions 36 of terminals 34 and a pad 19 molded on the first surface of base 10.

The cover 66 is molded of plastic and has a first surface 68 and an opposed second surface 69 (not visible), opposed top and bottom sidewalls 72, 74 respectively, and opposed left and right endwalls 79, 80. The bottom sidewall 74 contains a grommet 77 where phone company wires (not shown) enter for termination to terminals 77; the wires are installed through the grommet before it is fit into a U-slot in the bottom wall 74. The top wall 72 has an overhang 73 coplanar therewith which extends beyond first surface 68 and shields the interface between plug member 86 and cover 66; channels 85 in first surface 68 aid in breaking surface tension to prevent ingress of water. Apertures 82 receive first mating members 41 as aperture 84 receives jack 57. The cover is held to base 10 by latches 78 (FIG. 4) which engage opposed insets 30 in base 10. Raised section 71 covers the lightning arrestor 25.

Referring still to FIG. 1, the plug member 86 has a first surface 88 and a second surface 89 to which second terminals 134 are fixed. The second surface is flanked by top and bottom sidewalls 90, 91 respectively, and left and right endwalls 92, 93 respectively. The premises wiring enters the plug member through grommet 94 in bottom wall 91 and attaches to screws 137 in intermediate portions 136 of the second terminals 134. Each terminal 134 has a second mating member 141 extending substantially normally to second surface 89; each member 141 is flanked by a leg member 95 molded with the plug member 86 and having a U-shaped cross section which contains the adjacent mating member 141 to protect it from deformation. The leg members 95 extend beyond the mating members 141 and thus enter apertures 82 to insure proper alignment of the plug member 86 with cover 66 before first terminals 34 engage second terminals 134. Ribs 99 on the edges of endwalls 92, 93 are slightly narrower and lower than channels 85 in which they are received. Channel 98 in top wall 90 breaks surface tension to prevent ingress of water, and in cooperation with ribs 99 and channels 85 precludes the necessity of providing a discrete seal between the plug member 86 and cover 66.

FIG. 2 is a perspective of first terminals 34 exploded away from each other in the common horizontal plane in which they mount to first surface 12 of base 10 (FIG.

1). Each terminal 34 is stamped and formed from sheet metal having good spring characteristics, such as beryllium-copper. Each terminal 34 has an intermediate portion 36 having a hole 38 stamped therethrough which is formed as a simple nut to receive the thread on screws 37 (FIG. 1). The terminals 34 are each formed with four latching legs 39 having barbs thereon to provide an interference fit in slots 15 molded in base 10 (FIG. 4). The terminals 34 are each formed with a first mating member 41 comprising a spring arm 42 which extends from the intermediate portion 36 to a bend 43, a bearing section 44 extending from bend 43 to bend 45, and an engaging section 46 extending from bend 45 to distal end 47. The spring arms 42 are formed perpendicular to the intermediate portion 36, and thus stand perpendicular to the first surface 12 of the base 10, since the intermediate portion mounts flushly thereto. The bearing sections are formed at about 45 degrees to intermediate portion 36 and the engaging sections are at 105 degrees to the adjoining bearing sections, or 60 degrees to the base. These angles provide for easy engagement and position retention with second terminals 134, as will be explained (FIG. 5).

Referring still to FIG. 2, each terminal 34 is formed with a side angle 50 paralleling the spring arm 42 at the opposite side of the intermediate portion 36. Two terminals 34 (hereinafter the inner first terminals) have extensions 51 of angles 50; these are ultimately positioned with angles 50 adjacent and the extensions 51 lying between angles 50 of the other two terminals 34 (hereinafter the outer first terminals). Stanchions 53 which are perpendicular to extensions 51 of inner first terminals 34 and stanchions 53 perpendicular to angles 50 of the outer first terminals 34 are all in one plane when fixed to base 10. The stanchions 53 all have an outer end or bend 54 where the stanchions 53 meet respective spring contacts 55 formed integrally therewith. The spring contacts 55 are all formed at the same angle to the attached stanchion and are thus coplanar when the terminals 34 are fixed to the base 10 with the stanchions 53 coplanar with each other (FIG. 1). The outer terminals do not have extensions 51, but rather the intermediate portions 36 are partially cut away to form latch ledges 40. Note that both inner first terminals are formed from mirror image stampings, and both outer first terminals are formed from mirror image stampings.

FIG. 3 is a perspective of second terminal 134, which has features similar to a first terminal 34, like features being numbered similarly in the 100 series. Each of four second terminals 134 has an intermediate section 136 with a screw receiving hole 138 and latching legs 139 formed at right angles thereto for reception in slots in plug member 86 (FIG. 1). Second mating member 141 comprises a spring arm 142 formed at right angles to intermediate section 136 and extending therefrom to bend 143, from whence bearing section 144 extends to bend 145. An engaging section 146 extends from bend 145 to distal end 147 remote from intermediate section 136. Angles are as described for similar components of first terminal 34 (FIG. 2).

Figure 5:
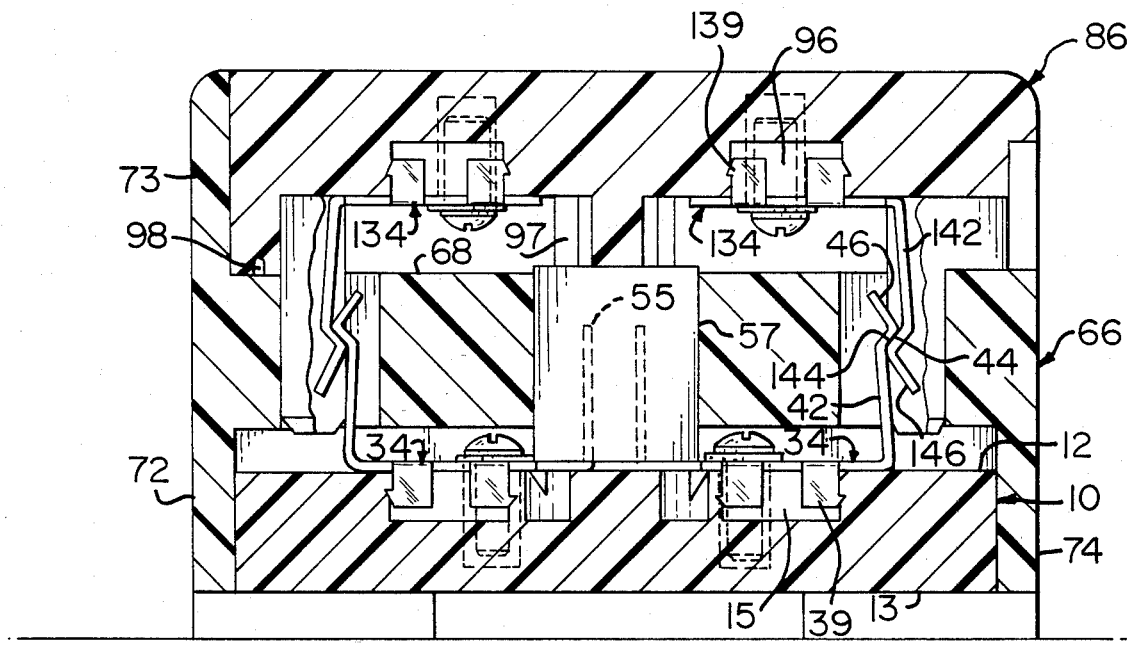
FIG. 5 is an end section of the assembled device.

FIGS. 4 and 5 are section views of the device in which FIG. 4 shows components exploded apart, and FIG. 5 shows the components assembled. Second surface 13 of base 10 sits on legs 17 which provide offset from a wall to which the base 10 mounts. The opposed first surface 12 has slots 15 therein which provide an interference fit for latching legs 39 on first terminals 34. Holes 32 receive screws 37 which terminate phone company wires, but do not serve to retain the terminals to base 10. Jack 57 is fitted to base 10 with legs 63 received in holes 31 in first surface 12. The legs 63 are latched under ledges 40 on first terminals 34, which are previously fixed to base 10. Thus the jack 57 is positioned to the same tolerance as the terminals 34 are fixed to the base 10. Cover 66 is fit over base 10 against feet 17 so that latches 78 in top and bottom walls 72, 74 engage insets 30 (FIG. 1). Aperture 84 receives jack 57 while apertures 82 receive mating members 41 to a height just below first surface 68. The second terminals 134 are protected on three sides by legs 95, which further aid in aligning plug member 86 to cover 66 by a close fit in the apertures 82, which in turn assures proper alignment of second terminals 134 with terminals 34. As the plug member 86 is moved toward the cover 66, respective engaging sections 46, 146 meet and slide across each other as spring arms 42 flex inward and spring arms 142 flex outward until bends 45, 145 are adjacent. Thereafter the spring arms 42, 142 urge the plug member 86 and cover 66 together as respective bearing sections 44, 144 slide across each other. Blank plug 97 extending from second surface 89 of plug member 86 is received in jack 57 and prevents entry of foreign matter which could cause short-circuiting of contacts 55. The overhang 73 fits against top side 90 of cover 86 to protect the interface from rain impingement. Channel 98 acts as a seal by breaking surface tension of any water creeping in.

Figure 6:
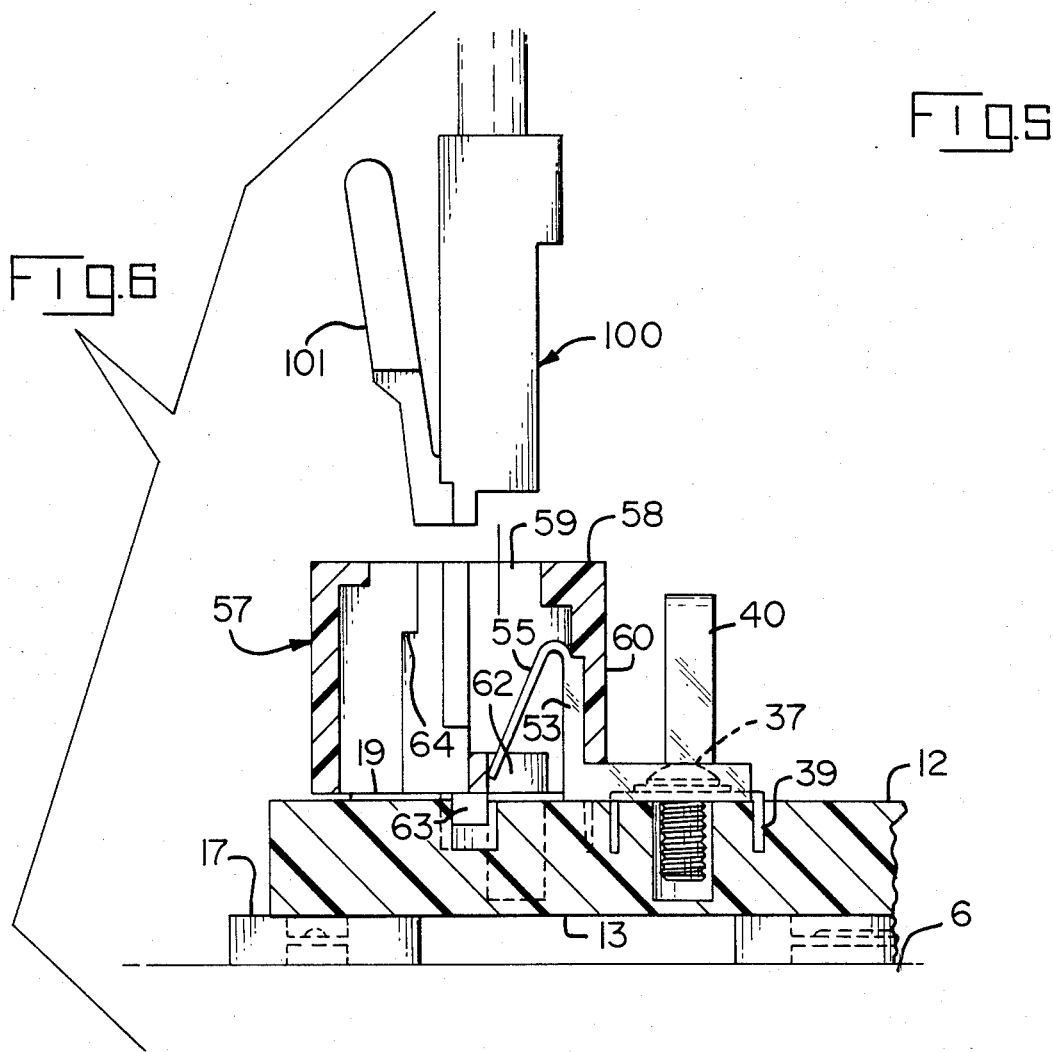
FIG. 6 is a partial side section showing the base and test jack with a plug exploded therefrom.

Connection of the plug member 86 to the cover 66 and base 10 as described above serves to connect premises wiring terminated to terminals 134 in the plug member 86 to phone company wiring terminated to terminals 34 on the base member 10. Should a subscriber's service be interrupted, the source of the problem may be checked by removing the plug member 86 and plugging the telephone plug 100 into the jack 57 as shown in FIG. 6. The plug 100 is a standard modular plug having four contacts therein which engage spring contacts 55. Stanchions 53 lie in channels in endwall of the jack 57 which together with barriers 62 therein maintain the spacing of the spring contacts 55. Latch arm 101 catches on ledge 64 to provide retention during testing.

FIG. 7 shows the assembled device as mounted to an exterior wall 6 of a subscriber's premises. Phone company wires 2 enter cover 66; subscriber's wiring 4 enters plug member 86, which has indents in left and right sidewalls 92, 94 to facilitate manual removal. The cover 66 is latched to the base 10 (FIG. 1) in a manner not apparent to the subscriber, requiring a special tool to prise top wall 72 sufficiently to release the latches 78 (FIGS. 4 and 5).

The foregoing description is exemplary and not intended to limit the scope of the claims which follow.

I claim:

1. A network interface device for terminating network telephone wiring at a subscriber's premises and for connecting the subscriber's wiring to the network which comprises:

a base having a first surface, an opposed second surface, and means for mounting said base to a fixed surface so that said second surface faces said fixed surface, said base carrying on said first surface a telephone jack having a plurality of spring contacts therein and a like plurality of first terminals for connecting to said network telephone wiring, said spring contacts being electrically connected to said first terminals, a cover having a first surface, an opposed second surface, and means for mounting said cover to said base so that said second surface of said cover faces said first surface of said base, said cover having a plurality of apertures therethrough between said first and second surface thereof which provide access to said first terminals and said jack, a plug member having a first surface, an opposed second surface, and means for mounting said plug member to said cover so that said second surface of said plug member faces said first surface of said cover, said plug member carrying on said second surface a plurality of second terminals for connecting to said subscriber's wiring and arranged for mating to said first terminals through said apertures when said cover is mounted to said base and said plug member is mounted to said cover.

2. A network interface device as in claim 1 wherein said first terminals are stamped and formed from sheet metal integrally with said spring contacts, each said first terminal comprising:

an intermediate portion fixed to said first surface of said base and having means for connecting to a respective network wire, a first mating member substantially normal to said first surface of said base and aligned with a respective aperture when said cover is mounted to said base, a stanchion substantially normal to said first surface of said base and contained in said jack, said stanchion having an outer end integral with said spring contact, the stanchion and spring contact of each first terminal lying in a plane parallel to the stanchion and spring contact of each other first terminal.

3. A network interface device as in claim 2 wherein the stanchion and spring contact of each terminal are coplanar and lie in a plane coincident with the first surface of said base.

4. A network interface device as in claim 1 wherein said first terminals are stamped and formed from sheet metal, each first terminal comprising a first mating member aligned with a respective aperture when said cover is mounted to said base, said first mating member comprising an elongate spring arm extending from said first surface of said base substantially normally thereof to a bearing section lying at a first oblique angle to said first surface of said base, said first mating member further comprising an engaging section extending from said bearing surface to a distal end of said first mating member remote from said first surface of said base, said engaging section lying at a second oblique angle to said base, said second terminals are stamped and formed from sheet metal, each second terminal comprising a second mating member aligned with a respective first mating member when said plug member is mounted to said cover, said second terminals lying in an array which reflects said first terminals when said plug member is mounted to said cover, said second mating member comprising an elongate string arm extending from said second surface of said plug member substantially normal thereto to a bearing section lying at said first oblique angle to said second surface of said plug member, said second mating member further comprising an engaging section extending from said bearing surface to a distal end of said second mating member remote from said second surface of said plug member, said engaging section lying at said second oblique angle to said second surface of said plug member, whereby, upon moving said plug member toward said cover with said second terminals aligned with said first terminals, each said engaging section of a respective first terminal will parallel a respective engaging section of a second terminal and will slide thereacross as the spring arms in each pair flex away from each other until said bearing sections come into engagement, each bearing section of a first terminal paralleling a respective bearing section of a second terminal and sliding thereacross as said spring arms in each pair flex toward each other until said plug member is against said cover.

5. A network interface device as in claim 1 wherein
each said first terminal comprises a first mating member substantially normal to said first surface of said base and aligned with a respective aperture when said cover is mounted to said base, each said first mating member having a distal end lying below said first surface of said cover, each said second terminal comprises a second mating member substantially normal to said second surface of said plug member, each said second mating member being aligned with a respective aperture when said plug member is mounted to said cover, each said second mating member being closely flanked by a leg which fits closely in a respective aperture, each said second mating member having a distal end shorter than the flanking leg, whereby, said legs will mate with respective apertures before respective first and second mating members come into contact.

6. A network interface device as in claim 1 wherein said plug member has a blank telephone plug on said second surface thereof, said blank plug being received in said jack through said aperture in said cover providing access thereto when said plug member is mounted to said cover, whereby said jack and spring contact therein are protected from foreign matter when said device is assembled.

* * * * *